United States Patent [19]

Keesen et al.

[11] Patent Number: 4,882,627
[45] Date of Patent: Nov. 21, 1989

[54] NOISE REDUCTION SYSTEM

[75] Inventors: Heinz-Werner Keesen; Hartmut Peters, both of Hanover, Fed. Rep. of Germany

[73] Assignee: Deutsche Thomson-Brandt GmbH, Villingen-Schwenningen, Fed. Rep. of Germany

[21] Appl. No.: 163,827
[22] PCT Filed: May 30, 1987
[86] PCT No.: PCT/EP87/00281
 § 371 Date: Feb. 8, 1988
 § 102(e) Date: Feb. 8, 1988
[87] PCT Pub. No.: WO87/07806
 PCT Pub. Date: Dec. 17, 1987

[30] Foreign Application Priority Data
 Jun. 7, 1986 [DE] Fed. Rep. of Germany ....... 3619222
 Jun. 7, 1986 [DE] Fed. Rep. of Germany ....... 3619223

[51] Int. Cl.⁴ .......................................... H04N 5/213
[52] U.S. Cl. ..................................... 358/166; 358/167
[58] Field of Search .................... 358/166, 167, 36, 37

[56] References Cited
U.S. PATENT DOCUMENTS

| 4,058,836 | 11/1977 | Drewery et al. | 358/167 |
| 4,223,341 | 9/1980 | Drewery | 358/36 |
| 4,275,418 | 6/1981 | Trump et al. | 358/167 |
| 4,291,333 | 9/1981 | Warnock et al. | 358/36 |
| 4,539,594 | 9/1985 | Illetschko | 358/166 |
| 4,549,213 | 10/1985 | Illetschko | 358/167 |

Primary Examiner—John W. Shepperd
Attorney, Agent, or Firm—Spencer & Frank

[57] ABSTRACT

A noise reduction system with motion detection for digitalized video signals, the system including at least one memory, a filter, a correction circuit, and an adder and/or subtracter, wherein the correction circuit weights differences and/or sums of luminance and/or chrominance values with a factor k, and wherein the factor k has positive or negative values depending upon the difference in the signals.

19 Claims, 3 Drawing Sheets

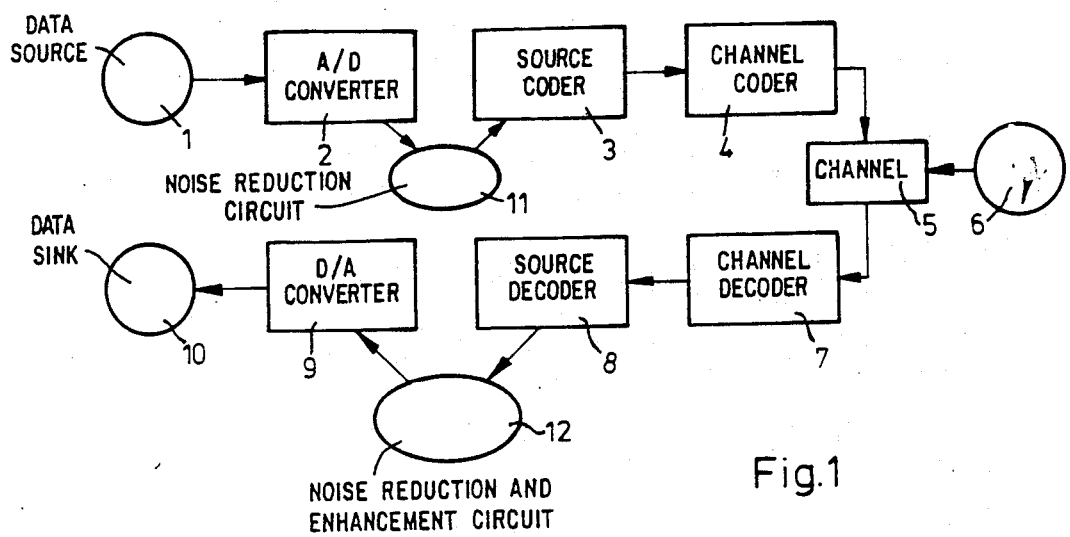
Fig.1
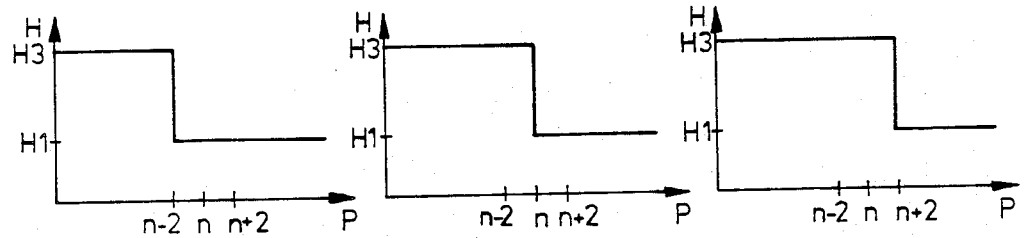
Fig.2A  Fig.2B  Fig.2C
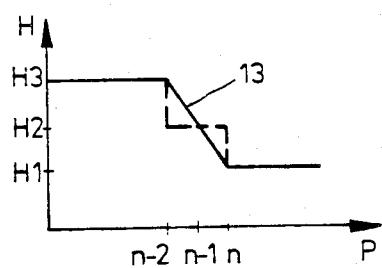 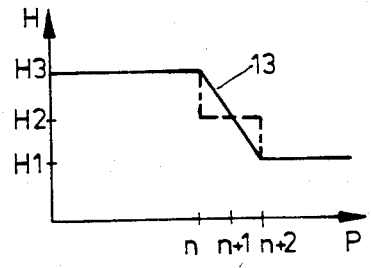
Fig.3A  Fig.3B

NOISE REDUCTION SYSTEM

BACKGROUND OF THE INVENTION

The invention relates to a noise reduction system with motion detection for digitalized video signals including at least one memory, a filter, a correction circuit, an adder, and/or a subtractor.

DE-OS No. 3,309,715 discloses a noise reduction system which delays a television signal in a frame memory. The drawback here is the digital memory which must be designed for the size of a frame. DE-OS No. 3,121,599 describes the associated lowpass filter, hereinafter called filter. In this filter, all surrounding and adjacent pixels around an interfered-with pixel are included in the weighting. These are the adjacent pixels in the current line and the adjacent pixels from the preceding and subsequent lines.

SUMMARY OF THE INVENTION

It is the object of the invention to provide a simplified noise reduction system with motion detection for digitalized video signals.

This is accomplished according to the invention by the provision of a correction circuit for a digitalized video signal, the video signal including at least one of a luminance signal and a chrominance signal, the system including at least one memory for storing and outputting an enhanced video signal, a filter receiving the output of said at least one memory and producing a filtered output signal, a correcting circuit receiving said filtered output signal, and an algebraic adder for adding a correction produced by said correction circuit to the input video signal to produce the enhanced video signal.

To weight the luminance of a pixel, adjacent pixels are utilized. Adjacent pixels are initially the pixels disposed in the same line, one or more pixels preceding the current pixel and one or more pixels following the current pixel. Additionally, pixels are adjacent if they belong to the preceding field. These pixels of the preceding field are stored in a field memory. It is not necessary to employ a frame memory because the luminance and chrominance values of the current pixel and of the pixels adjacent thereto in the same line are fed directly to a weighting circuit. During read-out from the field memory, pixels of fields lying above one another are compared with one another if the respective first value is delayed by a line duration. In this way, an estimated value can be calculated for the luminance and chrominance value, respectively, of the pixel disposed therebetween in a second field; this corresponds to one-dimensional vertical filtering. This calculated estimated value is compared with the luminance and chrominance values of the pixel in the current field. A two-dimensional filter is limited to two one-dimensional filters. To detect motion, the result of the comparison between the luminance and chrominance values of the current field and the preceding field is fed to a horizontal filter. This horizontal filter now considers only luminance and chrominance values of pixels where the pixels lie in one line. A two-dimensional filter can thus be omitted. The one-dimensional filter delays the chrominance and luminance values by two pixels, compares the current pixel with the preceding pixel and with the next following pixel and transfers the result of this comparison to a table. The table then detects, with the aid of the incoming values, a desired output position and, according to a weighting factor k, assigns an output value to the incoming value. However, this table no only makes a decision according to noise and movement, it simultaneously also causes the signal edges to be steeper. Possible uses for this invention exist, on the one hand, at the transmitting end and, on the other hand, at the receiving end. At the transmitting end, the signal edges need of course not be made steeper. The edges are advantageously made steeper at the receiving end, with the weighting factor from this table then becoming negative.

For better understanding of the invention, one embodiment thereof together with drawing figures will now be described in detail.

BRIEF DESCRIPTION OF THE DRAWINGS

It is shown in:
FIG. 1, a data transmission system;
FIGS. 2 A-2C a moving edge;
FIGS. 3A and 3B an averaged moving edge.

DETAILED DESCRIPTION OF THE PREFERRED EMBODIMENT

Figure 4:
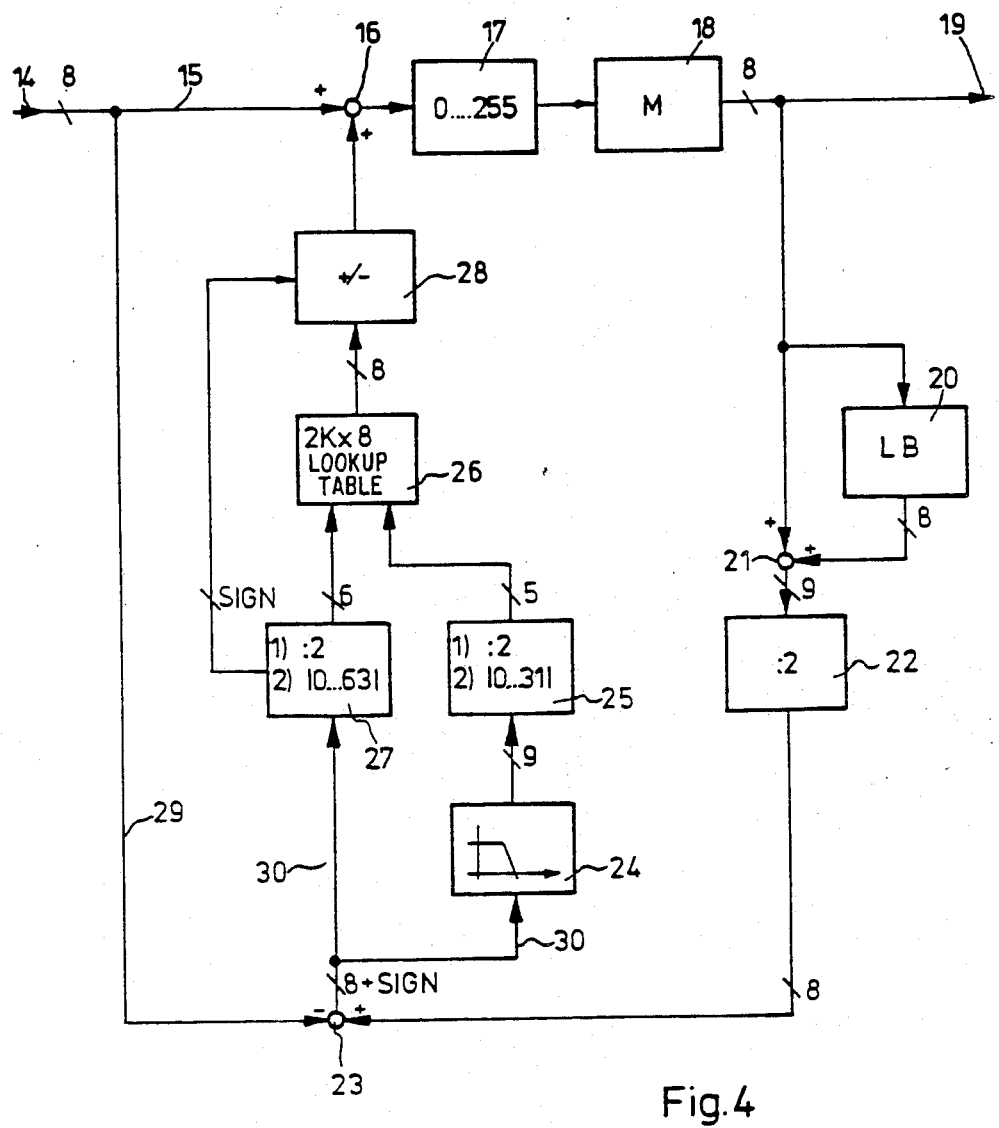
FIG. 4, a noise reduction and enhancement circuit.

FIG. 1 shows a data source 1, which gives electrical signals to an analog/digital or A/D converter 2, hereinafter called ADU 2. Digitalized signals travel from ADU 2 via a noise reduction circuit 11 to a source coder 3 which codes the signals after the noise has been removed. The coded signals are transmitted by channel coder 4, which provides the signals with redundancy, via a transmission channel 5 to a channel decoder 7. Transmission channel 5 is influenced by a noise 6. Channel decoder 7 transmits the noise-containing signals to a source decoder 8 where they are decoded. The decoded signals travel via a noise reduction and enhancement circuit 12 to a digital/analog or D/A converter 9, hereinafter called DAU9, and are analogized. The analog signals are fed to a data sink 10. Such a system, however, without noise reduction circuit 11 and noise reduction and enhancement circuit 12, is described, for example, in the dissertation by W. Mauersberger entitled, "Adaptive Transformationscodierung von digitalisierten Bildsignalen" [Adaptive Transformation Coding of Digitalized Video Signals], given at the Technical University of Aachen. This system is also applicable for a video recorder which stores the data in blocks on a magnetic tape and channel and source decodes them for video and/or audio playback. In this case, channel 5 is replaced by a magnetic tape. In channel coder 4, the digital signals to be transmitted or the signals to be stored on a magnetic tape are channel coded. That is, advisably the binary signals to be stored on a magnetic tape are converted to a biphase signal, are provided with parity bits and are stored on the magnetic tape. In channel decoder 7, the biphase signals are decoded and then a first error correction is possible with the aid of the parity bits. The data system composed of data source 1, ADU 2, source coder 3 and channel coder 4 may, however, also take the place of a transmitter, channel 5 may take the place of an HF transmission path and channel decoder 7, source decoder 8, DAU 9 and data sink 10 may take the place of a receiver, e.g. a television receiver.

FIG. 2 shows, in a coordinate system, the luminances H1 and H3 in a video line at locations n−2, n and n+2. The locations n−2 to n+2 characterize the position of picture elements, hereinafter called pixels. Between two fields, it is initially point n−2 and then point n+2 which is changed from light to dark if there is movement from the left to the right, e.g. a light-colored automobile in front of a dark background. FIG. 2A represents the first field, FIG. 2B the second field and FIG. 2C the third field.

For noise suppression, the luminance of the current field is added to the luminance of the preceding field and the result is divided by two. The resulting quotient is compared with the current field, i.e. the difference is formed. The difference is a measure for the noise component. If the difference is close to zero, noise, i.e. undesirable interference effects, can be considered to exist. If the difference is very high, which is the case, for example, for movement of a white automobile in front of a dark background, an effect occurs which is called the looping effect. This looping effect is shown in FIG. 3. FIG. 3A shows, at location n−1, the mean luminance value H2 between the other two extreme luminance values H1 and H3. A simple noise reduction circuit which operates with simple quotient formation, forms an average at locations n−2 and n for location n−1 and indicates a false luminance value for pixel n−1. This looping effect must be detected and corrected by a noise reduction circuit. FIG. 3B shows the same effect as the preceding figure at location n+1. FIGS. 3A and 3B show a looped edge 13 extending from the left to the right.

FIG. 4 shows the block circuit diagram for a circuit 11 and a second circuit 12 for noise reduction and/or enhancement. Enhancement is also known by the expression "crispening" or "edge steepening". Input 14 has eight data lines 15 which are brought to a summing member 16. The summing member 16 is preceded by a delay member (not shown) which delays incoming data by the processing time of the remainder of the circuit. Eight data lines go from summing member 16 to a limiter 17. Limiter 17 limits digital signals or binary values to a range which lies between zero and 255. Eight data lines go from limiter 17 to memory 18. Memory 18 is a field memory. Memory 18 is freely addressable and is advantageously formed by n RAM modules EDH 84 H 64 C-5-55 made by Electronic Inc.; they have a memory capacity of 64K×4 bits, with n lying in an order of magnitude of 7. This is based on a picture size of 720 pixels per line and 288 lines per field. From this memory 18, eight data lines are brought to output 19. At the same time, the same eight data lines go to a line memory 20, hereinafter called line buffer.

This line buffer is advantageously also constructed as a RAM having a capacity of 2K×8 bits. This memory may advantageously be constructed of modules HM 65162 made by Harris. Additionally, the eight data lines of field memory 18 go to an adder 21 to which come an additional eight data lines from the output of line buffer 20. Thus, binary values are added in adder 21 which are a measure of the luminance of two lines lying above one another in a field. Thus line buffer 20, adder 21 and divider 22 perform vertical filtering. Nine data lines lead from adder 21 to subtracter 23. A division as shown in divider 22, can be realized with binary signals in that the last base, the LSB (least significant bit) is left unconsidered and the ninth line is not connected with subtracter 23 but is left open. The eight data lines from input 14 are additionally brought directly to subtracter 23. In subtracter 23, the values the current field present at input 14 are subtracted from the values coming from the adder 21. At the output of subtracter 23 there thus appear differences, i.e. eight bits and a sign, hereinafter called signum. Nine data lines for the eight bits and the signum bit lead from subtracter 23 to a horizontal filter 24. Nine data lines lead from filter 24 to a limiter and amount former 25. From the nine bits arriving in the nine data lines, the first bit, the signum bit, is ignored by the amount formation. Of the remaining eight bits, a division by two causes the last bit, the least significant bit, to also be ignored. The limitation to a value between zero and 31 can be approximated if, the two most significant bits, MSB, are ignored. Five data lines with five bits lead from limiter and amount former 25 to a correction circuit 26, hereinafter called lookup table 26. The nine data lines for the eight bits and the signum bit also lead from subtracter 24 to a second limiter and amount former 27. Upstream of the second limiter and amount former 27, a delay member (not shown) is incorporated to compensate for a delay in filter 24. The second limiter and amount former 27 divides the bits arriving in the eight data lines by two, i.e. it ignores the least significant bit (LSB) and forms the amount, i.e. it ignores the signum. The data line with the signum is forwarded to module 28. Six data lines lead from limiter and amount former 27 to lookup table 26. The signum bit, the least significant bit and the most significant bit here remain unconsidered. Lookup table 26 includes a PROM memory module having 2k×8 bits and is formed of a module 87S191 by National. The contents of the lookup table can be described by the following computer program:

```
DO I1=0,2
    DO I2=1,63
        LOOKUP(I1,I2)=INT(2*I2*6/10)
    ENDDO
ENDDO
DO I1=3,31
    DO I2=1,63
        NC=NINT(0.6-0.9/29*(I1-2)*100)
        LOOKUP(I1,I2)=INT(2*I2*NC/100)
    ENDDO
ENDDO
```

Under the address formed of the 11 bits, once five bits and once six bits, furnished by amount formers and limiters 25 and 27, an output value having eight bits is put out and forwarded to adder 16. In module 28, the signum bit from subtracter 23 is added again. Adders and subtracters 16, 21 and 23 are each formed of two modules 74F382. Limiters and amount formers 25 and 27 are not circuits in the actual sense but merely indicate that data lines are not connected or remain unutilized. Modules 18, 20–22 and 23–27 replace a two-dimensional filter. Modules 18, 20–22 weight a first dimension, modules 23–27 a second dimension. Modules 16 and 28 may be combined into an adder/subtracter (F382) in which a line SIGN controls the calculating operation.

Figure 5:
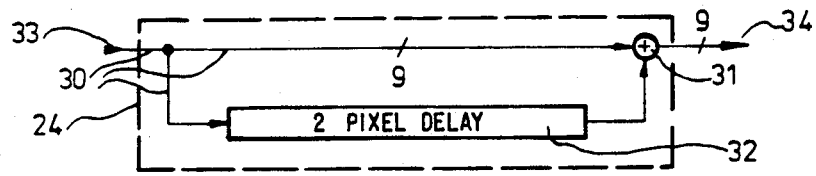
FIG. 5, a filter.

FIG. 5 shows the structure of a filter 24. Nine data lines 30 for eight bits and a signum bit lead from input 33 to a delay member 32 and an adder 31. The delay member 32 delays by two picture elements or pixels the binary data which are a measure for the difference in luminance and chrominance. Three octal delay flip-flops of type LS 374 are employed for this purpose.

Adder 31 is formed of modules 74F382. From three successive values belonging to three successive pixels the filter weights the respective two outer values and leaves the middle value unconsidered. For the middle pixel n there thus results a FILTEROUT value which is calculated according to the following equation:

current pixel number N

FILTEROUT=INT (PIXELDIF(N−1)+PIXELDIF(N+1))

The addition takes place in adder 31. At output 34 a sum is thus present in nine data lines.

Figure 6:
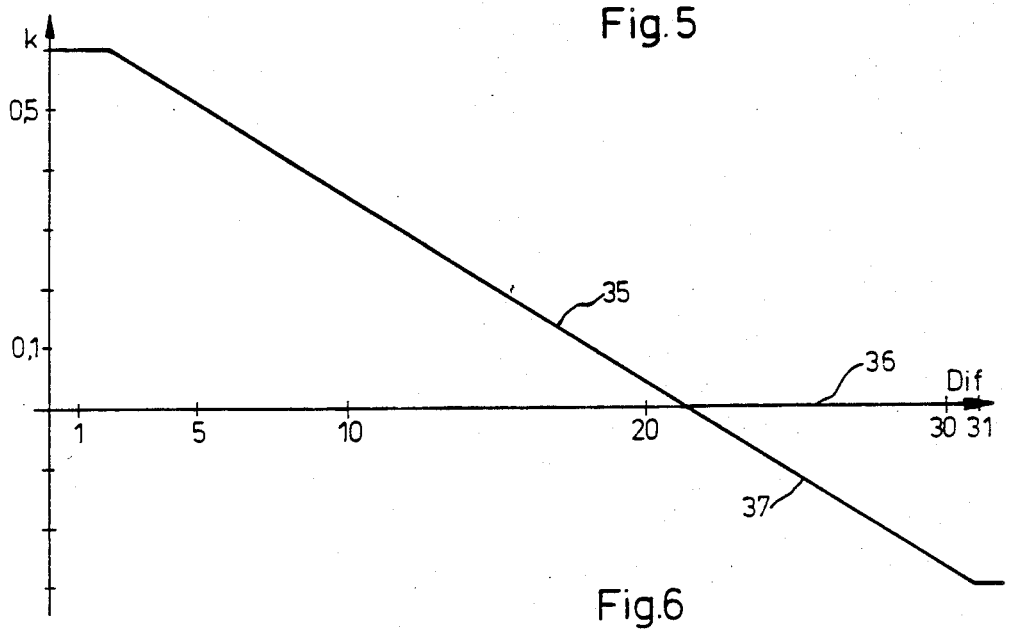
FIG. 6, a coordinate system employing a weighting factor k.

FIG. 6 describes, with the aid of a curve in a coordinate system, the differences between noise reduction circuit 11 and noise reduction and enhancement circuit 12. The difference resulting from amount former and limiter 25 is plotted on the abscissa. This difference leads to a weighting factor k. The factor K is stored in lookup table 26 and can be calculated according to the above-stated program. For noise reduction circuit 11, curve 35 for differences greater than 21 continues as curve 36 on the abscissa and does not drop into the negative range. For noise reduction and/or enhancement circuit 12 with edge steepening or crispening or enhancement, curve 35 becomes negative for differences greater than 21 and throws out negative values. According to factor k, differences are weighted or multiplied and added to the input signal.

Figure 7:
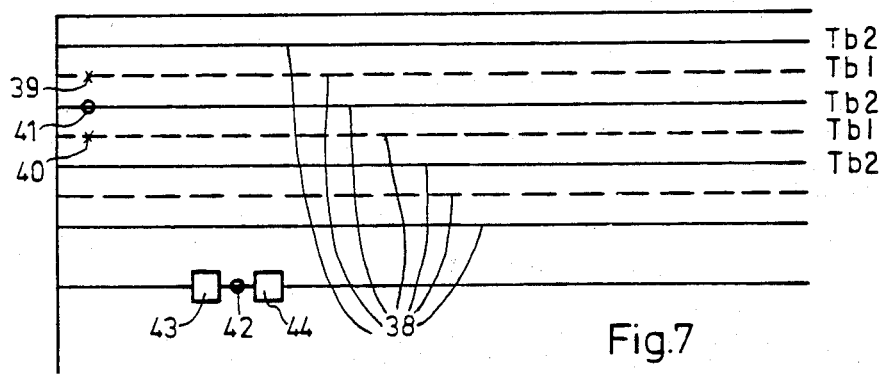
FIG. 7, pixels on a screen.

FIG. 7 shows a television screen on which an electron beam sweeps over video lines 38 belonging to a first field Tb1 and a second field Tb2. From two luminance and/or chrominance values belonging to two pixels 39 and 40 lying next to one another in two different lines of a field, an estimated value is calculated for the luminance and/or chrominance value of pixel 41 lying therebetween in a second field Tb2. This calculation is performed in blocks 20–22. A pixel 42 is weighted with the factor k which results on the basis of the luminance and chrominance values of the preceding pixel 43 and the subsequent pixel 44. This weighting is performed in circuit components 24 to 25.

We claim:

1. In a noise reduction system for a digitalized video signal, the video signal including at least one of a luminance signal and a chrominance signal, the system including at least one memory means for storing and outputting an enhanced video signal, a filter receiving the output of said at least one memory means and producing a filtered output signal, signal difference forming means for forming a difference signal between the filtered output signal and the input signal, a correction circuit receiving said difference signal, and an algebraic adder for adding a correction produced by said correction circuit to the input video signal to produce the enhanced video signal, the improvement wherein said correction circuit weights said difference signal with a factor k, and said factor k has positive and negative values.

2. System according to claim 1, wherein said correction circuit weights said difference signal by multiplication with said factor k.

3. System according to claim 1, wherein said correction circuit includes a horizontal filter which weights said difference signal for at least one pixel before and at least one pixel after a current pixel.

4. System according to claim 1, wherein said filter processes said enhanced video signal by combining two or more pixels which lie above one another in two or more successive lines of field.

5. System according to claim 4, wherein said filter weights the video signal values at two spaced locations in a first field as an estimated value for the value of a pixel disposed therebetween.

6. System according to claim 5, wherein said memory means stores a field.

7. In a noise reduction system for a digitalized video signal, the video signal including at least one of a luminance signal and a chrominance signal, the system including at least one memory for storing and outputting an enhanced video signal, a filter receiving the output of said at least one memory and producing a filtered output signal, signal difference forming means for forming a difference between the filtered output signal and the input signal, a correction circuit receiving said difference signal, and an algebraic adder for adding a correction produced by said correction circuit to the input video signal to produce the enhanced video signal, the improvement comprising: said correction circuit including a horizontal filter which weights values of the video signal for at least one pixel before and at least one pixel after a current pixel, and wherein said correction circuit weights algebraic sums of video signal values with a factor k, and said factor k has positive as well as negative values.

8. System according to claim 7, wherein said filter weights values of the video signal for at least two pixels which lie above one another in two or more successive lines of a field.

9. System according to in claim 8, wherein said filter is a vertical filter which weights the video signal values at two spaced pixels of a first field as the estimated value for the video signal value of a pixel disposed therebetween.

10. System according to claim 7, wherein said memory means stores video signal values of pixels of a field.

11. Noise reduction system with motion detection for processing an input digitalized video signal which sequentially represents pixel element information to produce an enhanced video signal, the input video signal representing a plurality of pixels displayed in lines in a video field, in which the input video signal is one of a luminance signal and a chrominance signal, comprising:

vertical signal processing means receiving the previous enhanced video signal and producing an output signal containing information from corresponding pixel elements in adjacent lines in a single video field;

first algebraic summing means for producing an output signal representing an algebraic difference between two input signals, said algebraic summing means receiving as the two input signals said input video signal and said output signal from said vertical signal processing means;

horizontal filter means receiving said output signal from said algebraic summing means and producing an output signal containing information from a current pixel signal and a previous pixel signal from the same line;

correction circuit means receiving said output signal from said horizontal filter means and from said first algebraic summing means and producing an output signal representing a correction signal wherein said correction circuit means weights algebraic sums of video signal values with a factor k, and said factor k has positive as well as negative values; and second algebraic summing means for combining said correction signal with said input video signal and producing an enhanced video signal.

12. Noise reduction system as claimed in claim 11, wherein said horizontal filter means comprises delay means receiving said output signal from said algebraic summing means and delaying said output signal from said algebraic summing means an amount of time corresponding to two pixel signals, and summing means for receiving and summing said output signal from said algebraic summing means and said delayed signal from said delay means.

13. Noise reduction system as claimed in claim 11, further comprising a limiting means which receives as an input signal the output signal from said first algebraic summing means and produces an output signal corresponding to the input signal with the least significant digit and the most significant digit removed, said output signal of said limiting means being supplied to said correction circuit means.

14. Noise reduction system as claimed in claim 11, wherein said vertical signal processing means includes a line buffer and third algrebraic summing means for combining a video signal line with a preceding line to produce a combined output signal, and dividing means for dividing said combined output signal by two.

15. Noise reduction system as claimed in claim 11, wherein said correction circuit means includes memory means for producing an output value from a table of stored values.

16. Noise reduction system as claimed in claim 15, further comprising a limiting means which receives as an input signal the output signal from said horizontal filter means and produces an output signal corresponding to the input signal with the least significant digit and the two most significant digits removed, said output signal of said limiting means being supplied to said memory means.

17. Noise reduction system as claimed in claim 11, further comprising memory means for storing the enhanced video signal and for supplying the enhanced vodeo signal to said vertical signal processing means.

18. Noise reduction system as claimed in claim 17, wherein said horizontal filter means comprises delay means receiving said output signal from said algebraic summing means and delaying said output signal from said algebraic summing means an amount of time corresponding to two pixel signals, and summing means for receiving and summing said output signal from said alebraic summing means and said delayed signal from said delay means.

19. Noise reduction system as claimed in claim 18, wherein said vertical signal processing means includes a line buffer and third algrebraic summing means for combining a video signal line with a preceding line to produce a combined output signal, and dividing means for dividing said combined output signal by two.

* * * * *